(12) United States Patent
Utsumi

(10) Patent No.: US 6,243,741 B1
(45) Date of Patent: Jun. 5, 2001

(54) REMOTE COMMANDER AND NETWORK CONNECTING SYSTEM

(75) Inventor: Yoshimasa Utsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/984,050

(22) Filed: Dec. 3, 1997

(30) Foreign Application Priority Data

Dec. 13, 1996 (JP) .................................................. 8-352455

(51) Int. Cl.⁷ .............................. G06F 15/17; G06F 13/38
(52) U.S. Cl. ............................................ 709/208; 345/327
(58) Field of Search ..................................... 709/201, 208, 709/218; 707/10, 3; 340/825.56; 345/327, 334

(56) References Cited

U.S. PATENT DOCUMENTS

| | | | |
|---|---|---|---|
| 4,003,060 | * | 1/1977 | Broce et al. ........................ 455/333 |
| 4,788,983 | * | 12/1988 | Brink et al. ........................ 600/547 |
| 4,852,073 | | 7/1989 | Shinohara et al. .................... 369/32 |
| 4,866,542 | * | 9/1989 | Shimada et al. .................... 360/10.3 |
| 4,965,557 | | 10/1990 | Schepers et al. ..................... 345/169 |
| 5,191,423 | * | 3/1993 | Yoshida ............................. 358/191.1 |
| 5,412,377 | * | 5/1995 | Evans et al. ...................... 340/825.22 |
| 5,414,426 | * | 5/1995 | O'Dunnell et al. .................... 341/176 |
| 5,481,256 | * | 1/1996 | Darbee et al. .................... 340/825.56 |
| 5,488,409 | * | 1/1996 | Yuen et al. ............................... 348/5 |
| 5,508,703 | * | 4/1996 | Okamura et al. ..................... 341/176 |
| 5,523,800 | * | 6/1996 | Dudek .................................. 348/734 |
| 5,572,576 | * | 11/1996 | Klausner et al. ....................... 379/67 |
| 5,650,831 | * | 7/1997 | Farwell ................................ 348/734 |
| 5,689,799 | * | 11/1997 | Dougherty et al. ....................... 455/2 |
| 5,715,311 | * | 2/1998 | Sudo et al. ........................... 379/428 |
| 5,774,666 | * | 6/1998 | Portusi .................................. 709/218 |
| 5,778,181 | * | 7/1998 | Hidary et al. ........................ 709/218 |
| 5,790,115 | * | 8/1998 | Pleyer et al. .......................... 345/327 |
| 5,903,264 | * | 5/1999 | Moeller et al. ....................... 345/327 |
| 5,905,493 | * | 5/1999 | Belzer et al. ......................... 345/334 |
| 5,929,846 | * | 7/1999 | Kikinis ................................. 345/327 |
| 6,005,563 | * | 12/1999 | White et al. .......................... 345/327 |
| 6,011,546 | * | 1/2000 | Bertram ............................... 345/327 |

* cited by examiner

Primary Examiner—Le Hien Luu
Assistant Examiner—Bunjob Jaroenchonwanit
(74) Attorney, Agent, or Firm—Ronald P. Kananen; Rader, Fishman & Grauer

(57) ABSTRACT

An exclusively-used key accessible to the Internet is provided on a remote commander, and further another protocol name inputting exclusively-used key for inputting an URL (Uniform Resource Locators) address is employed and a host name input key is employed. Accordingly, input operations for inputting the respective alphabets of the URL address can be eliminated while avoiding the erroneous alphabet entering operations and also cumbersome operations.

30 Claims, 6 Drawing Sheets

| | | |
|---|---|---|
| FIG.5A | INET KEY | 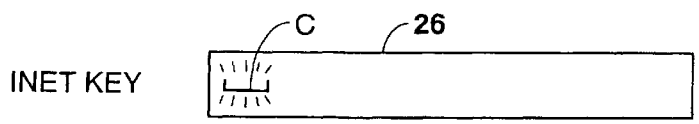 |
| FIG.5B | SCHEME KEY | 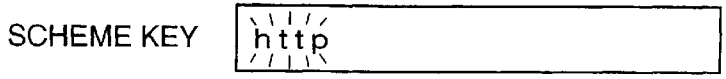 |
| FIG.5C | SELECT KEY | 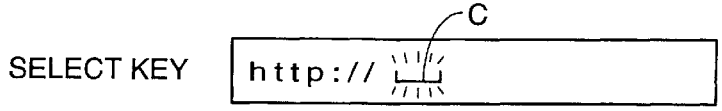 |
| FIG.5D | HOST KEY | 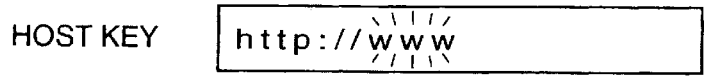 |
| FIG.5E | SELECT KEY | 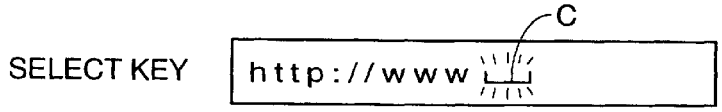 |
| FIG.5F | "7" KEY, SELECT KEY | 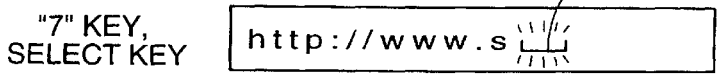 |
| FIG.5G | "5" KEY, SELECT KEY | 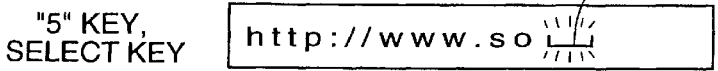 |
| FIG.5H | "5" KEY, SELECT KEY | 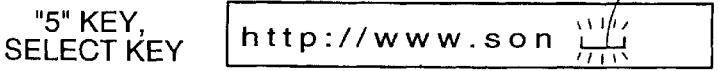 |
| FIG.5I | "9" KEY, SELECT KEY | 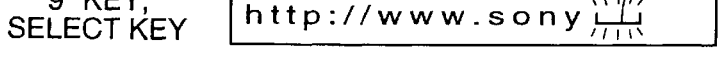 |
| FIG.5J | "." KEY, SELECT KEY | 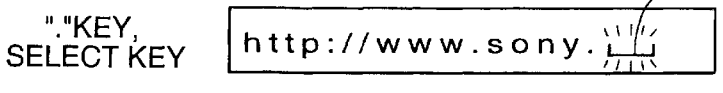 |
| FIG.5K | IDENTIFIER KEY | 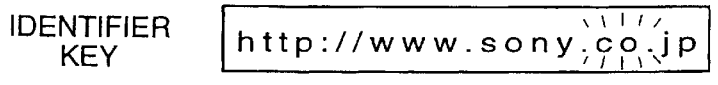 |
| FIG.5L | SELECT KEY | 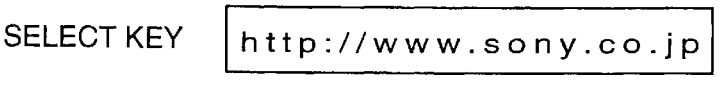 |
TRANSFER COMMAND

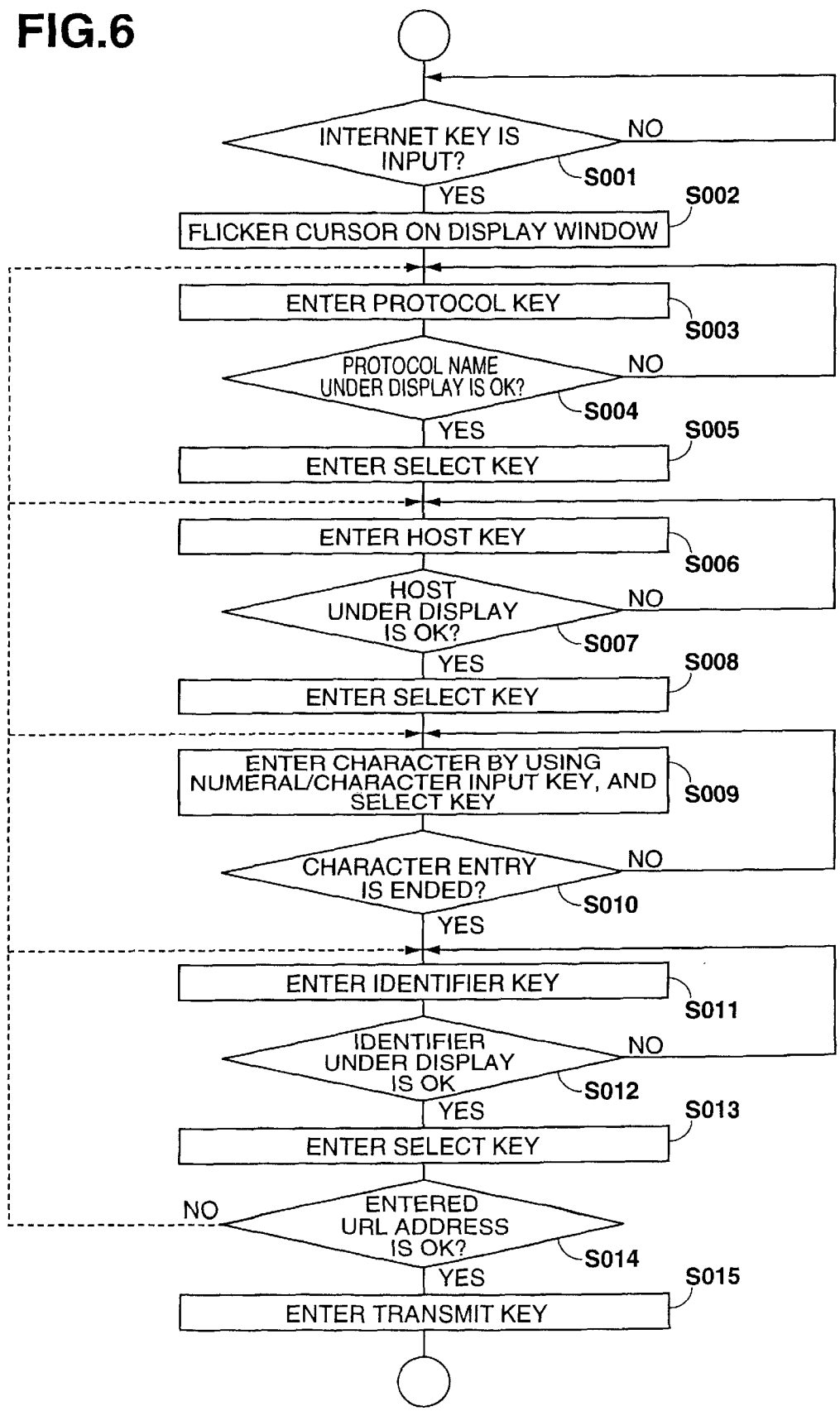

REMOTE COMMANDER AND NETWORK CONNECTING SYSTEM

BACKGROUND OF THE INVENTION

1. Field of the Invention

The present invention is related to a remote commander accessible to an address on a network, and to a network connecting system with employment of this remote commander.

2. Description of the Prior Art

Currently, personal computers are popularized to be widely used in various fields such as offices and homes. Moreover, personal computers are used as terminals accessible to various types of networks, e.g., a so-called "PC-communication network" and the Internet via modems and terminal adapters (TA) of ISDN (Integrated Services Digital Network).

For instance, when a user wishes to acquire information stored at a preselected address on the Internet network, an address code (URL; Uniform Resource Locators) is entered by using, e.g., a keyboard and a mouse to access this information, while employing a retrieving/displaying software, a so-called "browser". An URL address code is expressed by, for example, a protocol name (file classification, e.g., http (hypertext transport protocol), Gopher, ftp (file transfer protocol)), and a domain name (sort of host, e.g., www (Word Wide Web); organization name, e.g., SONY; sort of organization, e.g., co (corporate) e.g., go (government); and country code,e.g., jp (Japan)). This address code may be represented as follows:

http://www.sony.co.jp

It should be understood that a combination between a sort of organization and a country code will be explained as an identifier name in the specification.

As previously described, since such an URL address code is entered to access the Internet network, the data stored at the address corresponding to this URL address code may be read out and may be displayed on a monitor apparatus. However, in the case that personal computers are employed as terminals to access networks, environment setting operations are necessarily carried out in accordance with specifications of hardwares under use with respect to each of personal computers.

Under such a circumstance, television receivers having functions for allowing access to networks such as the Internet are known in this field (simply referred to as an "Internet TV" hereinafter). This type of Internet TV is constituted as a multimedia available television receiver. This multimedia TV is designed in such a way that even any users other than personal computer users can readily access networks.

That is to say, in an Internet TV, a modem and a TA (terminal adaptor) are previously assembled, and further a browser software is pre-installed to perform operation environment setting. As a consequence, every user can readily access networks without any cumbersome setting operations.

On the other hand, users are also required to input URL address codes in Internet TVs by connecting keyboards, mouses, and the like to the Internet TVs so as to enter characters. To this end, while the URL code input screen functioning as "browser" is constituted, desirable characters are selected to be entered by employing a remote commander and the like.

FIG. 1 schematically represents one conventional Internet television receiver 50 with pre-installed browser software, capable of selectively displaying a television broadcast program and a video input in response to selecting operation by users. In this drawing, a browser 52, and an URL input section are displayed on a display unit 51 constructed of, for instance, a CRT (cathode-ray tube). This browser 52 is capable of displaying data acquired from an accessed network.

On this browser 52, the following items are displayed, for instance, an icon group 53 where an alphabet is displayed as an icon; page selecting arrows 54 and 55 for changing the display mode of the icon group 53 into, e.g., numerals; an URL display section 56 for displaying thereon characters selected by the icon group 53; an enter icon 57 for transmitting the URL displayed on the URL display section 56 to a server; and a pointer 58 for selecting the above-described icons.

A remote commander 59 is capable of performing the normal manipulation of the television receiver, and further is equipped with a joystick 59a and the like, by which positional information may be entered. Thus, the pointer 58 may be moved in response to a command (positional information) transmitted by inputting the positional information via this joystick 59a, so that a desirable icon may be selected.

However, in this conventional Internet TV 50, the larger the number of characters of the URL address code is increased, the more the character input operation for entering the characters one by one becomes cumbersome. Also, in such a case that the protocol name, the host name, and the identifier name for constituting the URL address code are commonly used, when the user newly accesses the Internet network, the user must enter the characters one by one, resulting in cumbersome input operation.

The present invention has been made to solve the above-described problems in the conventional Internet TV system, and therefore, has an object to provide a remote commander capable of effectively entering an address such as an URL address code, and also a network connecting system with employment of this improved remote commander.

SUMMARY OF THE INVENTION

To achieve the above-described object, a remote commander, according to an aspect of the present invention, is featured by comprising: character keys capable of inputting at least one of numerical numbers and characters; character group memory for previously storing a character group which constitutes an address name used to access an address on a network; memory controller for selectively and sequentially reading the character group stored in the character group memory; and transmitter for transmitting an address code corresponding to the address name for constituting the character group read by the memory controller.

Also, a network connecting system, according to another aspect of the present invention is featured by comprising: character keys capable of inputting at least one of numerical numbers and characters; character group memory for previously storing a character group which constitutes an address name used to access an address on a network; character group memory controller for selectively and sequentially reading the character group stored in the character group memory; transmitter for transferring an address code corresponding to the address name for constituting the character group read by the memory controller; interface connectable to the network; and controller for performing an access process via the interface to an address on the network, the address corresponding to the address code transferred by the transmitter.

BRIEF DESCRIPTION OF THE DRAWINGS

A more complete understanding of the teachings of the present invention may be acquired by referring to the accompanying drawings, in which like reference numbers indicate like features and wherein:

FIG. 5 is an explanatory diagram for indicating various display modes of display windows in the remote commander in order to explain an input operation sequence of an URL address code; and FIG. 6 is a flow chart for describing the input operation sequence of the URL address code by using the remote commander of FIG. 5.

DESCRIPTION OF THE PREFERRED EMBODIMENTS

Various embodiment modes of the present invention will now be described in accordance with the below-mentioned sequence. It should be understood that a so-called "Internet TV" will now be described as a television receiver connectable, or accessible with the Internet network in this embodiment mode:

1. Arrangement of Internet TV according to this embodiment mode.
2. Structure of Remote Commander.
   2-1. Structure of Operation Unit,
   2-2. Circuit Arrangement.
3. URL address code Input Sequence by Remote Commander.

1. Arrangement of Internet TV according to this embodiment mode

Figure 1:
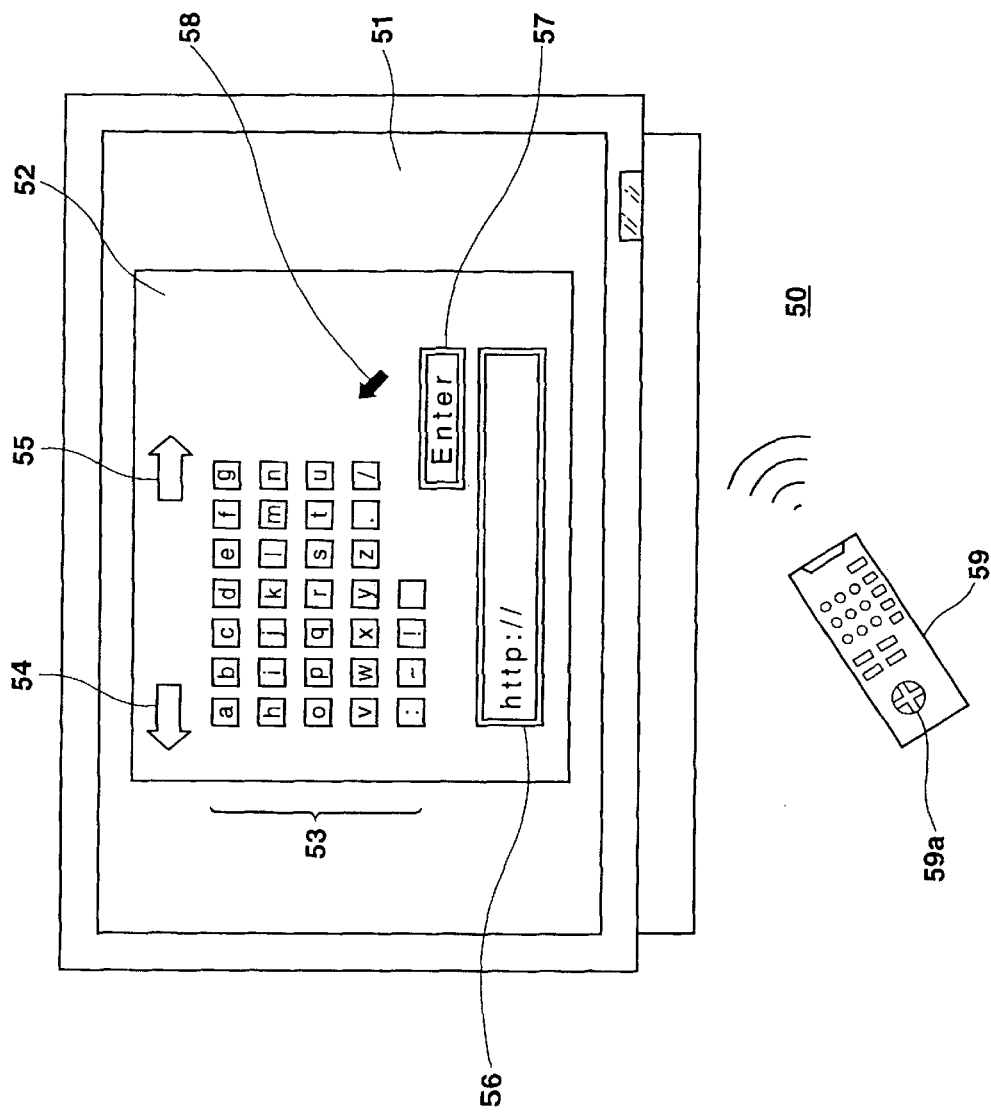
FIG. 1 schematically shows the conventional Internet TV screen equipped with the browser.
Figure 2:
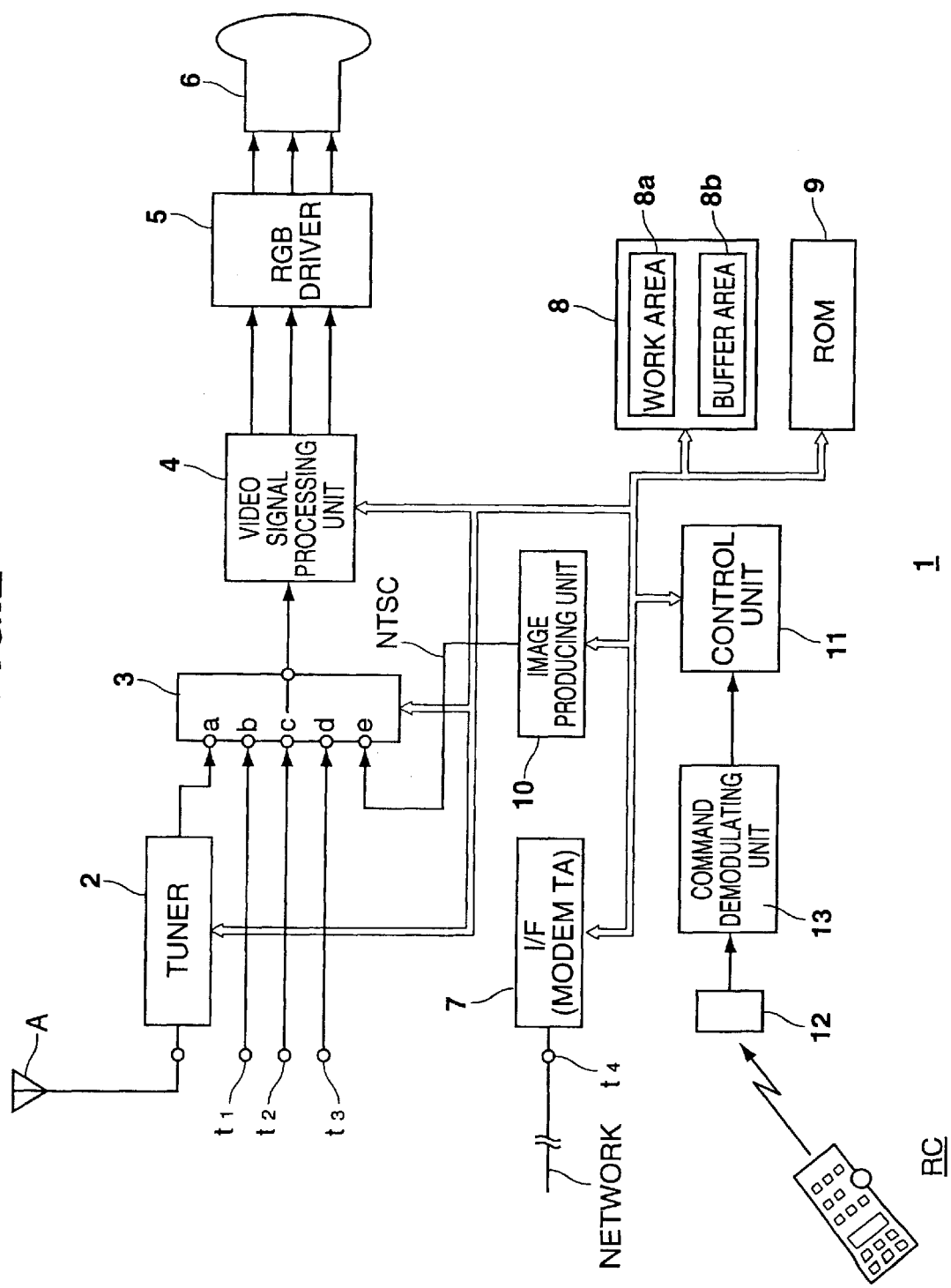
FIG. 2 schematically illustrates a block diagram of a television receiver, especially a video signal system, according to an embodiment of the present invention.

FIG. 2 is schematic circuit block diagram of the Internet TV 1, especially a video signal system, according to an embodiment of the present invention. It should also be noted that a television system employed in this Internet TV 1 according to this embodiment is, for example, the NTSC (National Television System Committee) system.

A tuner 2 selects broadcast program signals such as ground wave broadcasting program signals and satellite broadcasting program signals received by an antenna "A". External input appliances (digital video appliances, 8 m/m video appliances, not shown in detail) are connected to external input terminals t1, t2, and t3.

The signals outputted from the tuner 2, the external input terminals t1, t2, t3, and a reproduction signal (image signal) derived from an image producing unit 10 for producing this reproduction signal from data read from a network (will be explained later in detail) are selected by a switch 3. The switching control of this switch 3 is performed by, for instance, a selecting operation by a remote commander RC. That is, for example, when a user wishes to observe the broadcasting program selected by the tuner 2, a switching contact of this switch 3 is connected to a terminal "a". When the user wants to observe pictures of the external input appliance, the switching contact of this switch 3 is connected to any one of terminals "b", "c", and "d". When the user wishes to see information (image) supplied from the network, the switching contact of this switch 3 is connected to another terminal "e".

The video (image) signal selected by operating the switch 3 is supplied to a video signal processing unit 4 so as to be signal-processed in such a manner that synchronous (sync) signals are extracted, a luminance signal is separated, and color difference signals are formed. As a result, this video signal is outputted as a red (R) color signal, a green (G) color signal, and a blue (B) color signal (will be referred to as "RGB signals" hereinafter). Also, other picture control signal process operations, e.g., contrast control and color hue control are carried out in this video signal processing unit 4. It should also be noted that signal paths for the sync signals are omitted in FIG. 2.

The RGB signals outputted from the video signal processing unit 4 are supplied via an RGB driver 5 to a CRT 6 constituted as a display unit, in which an image (picture) is formed.

On the other hand, the Internet TV 1, according to this embodiment, is arranged such that various sorts of information can be acquired via a network in addition to the tuner 2 and the external input appliances. To this end, another terminal "t4" connectable to the network is provided, through which communication data may be entered.

Normally, since the communication data is coded, the communication data entered from the terminal t4 is demodulated by an interface 7 constituted by, for example, a modem, a TA (terminal adaptor) and the like. The interface 7 may also modulate data (for instance, image data and text data) produced inside the Internet TV 1, and commands (for example, URL address) to transmit the modulated data/commands. Alternatively, this interface 7 may be arranged to be connectable with the Internet TV 1 as an external appliance of this Internet TV 1.

A RAM (Random Access Memory) 8 is constituted by a work area 8a and a buffer area 8b. In this work area 8a, for instance, various calculating process operations are executed, and a software such as an initiated browser software is stored. The buffer area 8b temporarily stores therein the communication data supplied (or transmitted) via the interface 7.

In a ROM (Read-Only Memory) 9, application softwares such as Web browsers are stored. These application softwares are read from the ROM 9 to be initiated when an initiation command is issued from a control unit 11 (will be explained later), and then are stored into the work area 8a of the RAM 8. Alternatively, the Web browser may be initiated at the same time when a power supply of this Internet TV 1 is turned ON, or may be arbitrarily initiated when the Internet TV 1 is connected to the network, if required.

An image producing unit 10 synthesizes the Web browsers initiated and stored in the work area 8a with the communication data stored in the buffer area 8b, and also converts the synthesized data into a video signal by a television system of the Internet TV 1 (namely, NTSC system in this embodiment), which will then be outputted to the terminal "e" of the switch 3. Then, the video signal (communication data) is supplied to the video signal processing unit 4, so that various signal processing operations are performed to this video signal.

In response to a command which is transmitted from a remote commander RC and then is supplied via a light receiving unit 12 and a command demodulating unit 13, a control unit 11 performs, for instance, the channel selection in the tuner 2, the switching control of the switch 3, and various signal process control operations in the video signal processing unit 4.

Furthermore, in accordance with this embodiment mode, the control unit 11 executes a writing operation and a reading operation of the communication data with respect to the RAM 8. For example, in such a case that the communication data demodulated by the interface 7 is displayed, both the browser stored in the work area 8a and the communication data stored in the buffer area 8b are read therefrom at predetermined timing, and the read data will be supplied to the image producing unit 10.

Also, when either the above-described data produced in the Internet TV 1 or an URL address transmitted from a remote commander (will be described later) is transmitted to the network, for example, after the data or the URL address is once stored into the buffer area 8b, these data or URL address are read at preselected timing to be supplied to the interface 7. As a consequence, the data is modulated by the interface 7 to be transmitted to the network.

The remote commander capable of transmitting commands to the Internet TV 1 is equipped with various sorts of operation keys, exclusively-used keys, and a display means used to monitor input information. The operation keys can be used to execute the normal operations such as the channel selection. The exclusively-used keys are employed so as to simply enter the URL address so as to access the network. As a consequence, the input operation of the URL address can be easily performed.

2. Structure of Remote Commander 2-1. Operation Unit of Remote Commander

Figure 3:
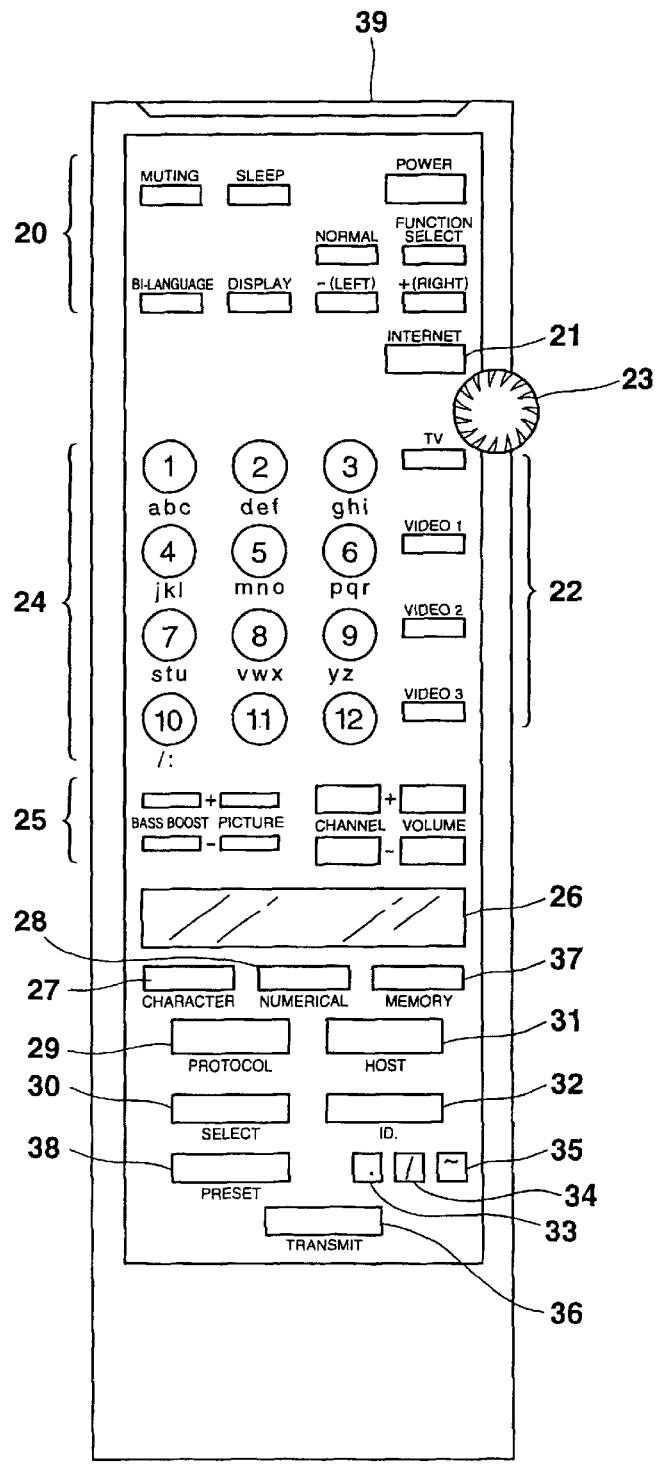
FIG. 3 is a plan view for explaining an operation unit of a remote commander according to an embodiment of the present invention.

FIG. 3 is a plan view for explaining an operation unit of the remote commander RC. Referring now to the block diagrams of the Internet TV 1 indicated in FIG. 2 and to FIG. 3, a description will be made of functions of various operation keys arranged on this remote commander RC.

As an operation key group 20, there are provided, for example, a power supply key, a mute key, a sleep key, a bilanguage (bilingual) key, a screen display key, function selection keys used to control images, a+ key (plus key), a − key (minus key), a normal key, and so on. The operation keys are arranged by which general-purpose operations of a television receiver can be performed.

An Internet key (will be referred to as an "INET key" hereinafter) 21 is such an operation key used to select the Web browser to display information on the screen of the CRT 6 when the Internet is accessed. In other words, the switch contact of the switch 3 is connected to the terminal "e" by manipulating the INET key 21, and the image produced in the image producing unit 10 is displayed, so that the Internet TV 1 can access to an address on the Internet. This operation mode will be referred to as an "Internet mode" (INET mode) hereinafter.

As another operation key group 22, for instance, a television key, and video keys (1 to 3) are arranged, by which the broadcasting program selected by the tuner 2, and the external input channel can be switched. In other words, when the operation key group 22 is manipulated, the switching controls of the terminal "a" to the terminal "d" in the switch 3 can be performed. In this embodiment, such an operation mode that either the tuner 2 or the external input channel is selected will be referred to as a television mode.

A joggle dial 23 is employed as an input means by which a display position of a cursor displayed on a display window 26 (will be explained later) can be moved in accordance with a rotation direction thereof and a rotation angle thereof, and also URL addresses stored in a storage means assembled in the remote commander RC can be sequentially and selectively displayed.

As a numeral/character input key group 24, for example, 12 pieces of operation keys such as a "1" key to a "12" key are arranged. In response to a predetermined selection operation, either a numeral input mode or a character input mode is selected to perform the input operation. In the numeral input mode, numerals 1 up to 12 can be entered. In the character input mode, alphabets indicated in the respective keys can be entered. As a consequence, for example, the broadcasting channel can be selected, and the characters of the URL address codes can be entered.

As an operation key group 25, there are arranged a bass boost key for emphasizing/deemphasizing a bass sound portion of voice; a picture key for controlling contrast and color density; a channel up key ; a sound volume up/down key and so on. This operation key group 25 can set the video (image)/audio to be monitored.

A display window 26 is constructed of, for instance, a LCD (Liquid Crystal Display) as a display means capable of displaying the URL address under enter operation, or preset by the remote commander RC and then read while the present operation mode is moved to the INET mode by manipulating the INET key 21.

When the present operation mode is moved to the INET mode, a character input key 27 and a numeral input key 28 are made as selection keys for selectively entering characters, or numerals by manipulating the "1" key to the "12" key arranged in the numeral/character input key group 24. In the case that the character input mode is selected by the character input key 27, for instance, the letters of "a", "b", "c" are sequentially and repeatedly displayed on the same display position of the display window 26 every time the "1" key is depressed. Similarly, as to the "2" key to the "12" key, the letters indicated under the respective keys are sequentially and repeatedly displayed.

Also, when the numeral input key 28 is selected, if the "1" key to the "12" key are depressed, then the numerals "1" to "12" indicated on the respective keys are entered.

A protocol key 29 is used to select a protocol name (for example, http) which has been previously registered in the remote commander RC. For instance, when the protocol key 29 is depressed in the INET mode, a protocol name of, for example, "http" is displayed on the display window 26 in a flicker mode. Under this condition, when the protocol key 29 is repeatedly depressed, the registered protocol names are sequentially displayed in such a display manner "http", "Gopher", and "ftp".

A selection key 30 can determine the protocol name, the host name, and the identifier name selected by manipulating the protocol key 29, a host key 31, and an identifier key 32 (will be explained later). For example, when the selection key 30 is manipulated under such a condition that the protocol name of "http" is selected by the protocol key 29, the protocol name is determined as "http". Then the display content is changed into the normal display mode, so that the operation mode is advanced to the next input operation (for example, host name input operation).

A host key 31 is used to select a host name (for example, www) which has been previously registered in the remote commander RC. For instance, when the host key 31 is depressed in the INET mode, a host name of, for example, "www" is displayed on the display window 26 in a flicker mode. Under this condition, when the host key 31 is repeatedly depressed, the registered host names are sequentially displayed in a similar manner to the protocol key 29. Then, when the selection key 30 is entered, the host name is determined and the present input operation is advanced to the subsequent input operation (for example, organization name).

An identifier key 32 is used to select an identifier name (e.g., co. jp) constructed of an organization sort and a country code which has been previously registered in the remote commander RC. For instance, when the identifier key 32 is depressed in the INET mode, an identifier, for example, "co.jp" is displayed on the display window 26 in a flicker mode. Furthermore, under this condition, when the identifier key 32 is repeatedly depressed, the registered protocol names are sequentially displayed in such a display manner that the identifier names stored as, for example, "co.jp", "go.jp", "or.jp", - - - , are replaced to be sequentially displayed. Then, when the selection key 30 is entered, the identifier name is determined. In this embodiment mode, both the organization sort and the country code have been explained as a single identifier. Alternatively, an exclusively-used entry key may be employed for each of the organization sort and the country code.

A "." key 33, a "/" key 34, and "~" key 35 are used in such a way that symbols ".", "/", "~" a frequently used during the input operation can be entered irrespective of the character input mode and the numeral input mode.

A transmit key 36 transmits the URL address via a transmitting unit 39 to the Internet TV 1, and the URL address is entered by using the numeral/character input key group 24, the protocol key 29, the host key 31, the identifier key 32, and the like to be thereby displayed on the display window 26. Then, an access process operation is carried out with respect to the transmitted URL address in the Internet TV 1.

The entered URL address can be stored into the remote commander RC by using a memory key 37. The URL address once stored in the remote commander can be read by manipulating a preset key 38. Alternatively, the URL addresses are not stored in a batch mode, but the protocol name, the host name, the identifier name, and the like may be separately stored.

A preset key 38 is employed to read out the URL address which has been stored in the remote commander RC before being marketed, or by the user, and then to display this read URL address on the display window 26. Then, when the transmit key 36 is depressed, the URL address being displayed on the display window 26 can be transmitted. In such a case that a plurality of URL addresses have been stored, for example, the URL addresses of "http://www.sony.co. jp", "http://www.abc.co.jp", "http://www.def.co.jp" may be sequentially read to be displayed every time the preset key 38 is depressed in a similar manner to the protocol key 29 and so on. Alternatively, while the preset key 38 is entered to advance the present operation mode to the read mode, the joggle dial 23 is rotated, so that the stored URL addresses may be selectively and sequentially read in response to the rotation direction.

As previously explained, since the exclusively-used input keys for inputting the URL addresses are employed in accordance with the present invention, the URL address enter operations can be simplified.

2-2. Circuit Arrangement of Remote Commander

Figure 4:
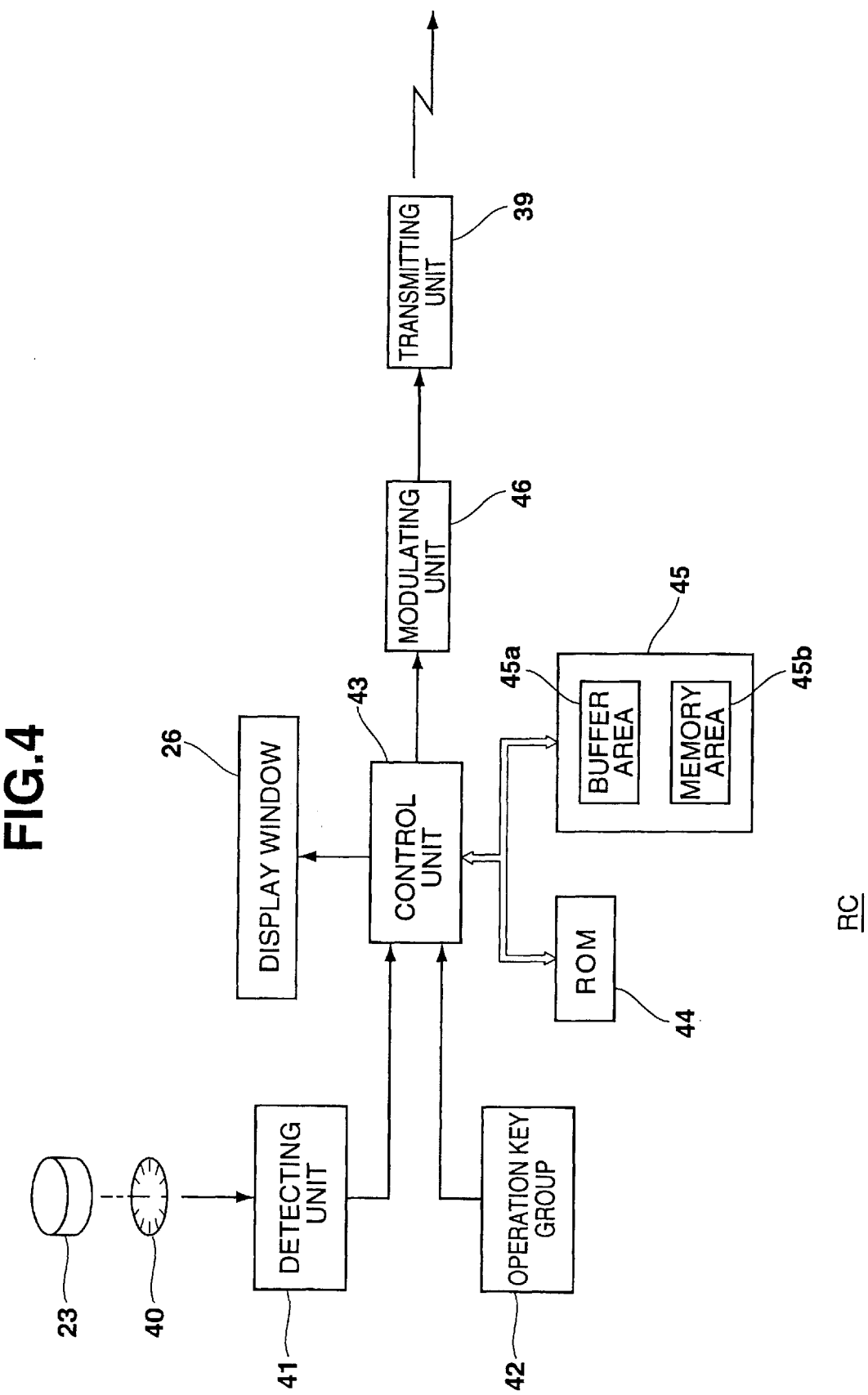
FIG. 4 is a schematic block diagram for representing a portion of an entire circuit arrangement for constituting the remote commander shown in FIG. 3.

FIG. 4 partially shows a circuit arrangement for constituting the remote commander RC.

When the joggle dial 23 is rotated, a rotary encoder 40 is rotated in combination with this joggle dial 23 to supply an input signal to a detecting unit 41.

The detecting unit 41 detects a rotation angle and a rotation direction of the joggle dial 23 from the input signal supplied from the rotary encoder 40, and then supplies the detected rotation angle and the detected rotation direction to a control unit 43.

An operation key group 42 represents the operation key groups 20, 22, 25, the INET key 21, the numeral/character input key group 24, and also the exclusively-used keys (i,e., protocol key 29, host key 31, identifier key 32) used to input the URL addresses, which are shown in FIG. 3. When these input key groups are manipulated, input signals are supplied to the control unit 43 in response to these input key operations.

For instance, when the television mode is selected, the control unit 43 reads out the relevant command code stored in the ROM 44 in response to the input signal supplied from the operation key group 42, and then outputs the read command code to a modulating unit 46.

Also, in the case that the INET mode is selected, and for instance, the input keys such as the protocol key 29, the host key 31, and the identifier key 32 are manipulated, the protocol name, the host name, and the identifier name, which are stored in the ROM 44, or the memory area 45b of the RAM 45, are read. Then, these read protocol name, host name, and identifier name are stored in the buffer area 45a of the RAM 45, and the display control is carried out for the display window 26.

In the ROM 44, the protocol names, the host names, and the identifier names have been coded to be stored, and these protocol names, host names, and identifier names are read by manipulating the protocol key 29, the host key 31, and the identifier key 32, and by the command codes in response to the various operation keys arranged in the operation key group 42.

The RAM 45 is constructed by a buffer area 45a and a memory area 45b. When, for instance, the protocol key 29 and the like are manipulated, the protocol name, the host name, and the identifier name read from the ROM 44 are once stored into the buffer area 45a to constitute the URL address. Therefore, when the transmit key 36 is manipulated, the URL addresses are read from the buffer area 45a and then are modulated. The modulated URL addresses are transmitted as, for example, infrared commands.

The memory area 45b is constituted as an area for storing the URL addresses which have been stored into the buffer area 45a by executing the input key operation by the user. For example, when the memory key 37 is operated after the user inputs the URL addresses, the URL addresses stored in the buffer area 45a are read to be stored into the memory area 45b. Also, for example, the protocol name, the host name, and the identifier name, which have been entered by using the numeral/character input key group 24 by the user, are stored in the memory area 45b.

As a consequence, when the preset key 38 is manipulated, the URL addresses are read from the ROM 44, or the memory area 45b to be stored into the buffer area 45a. Subsequently, when the preset key 38 is manipulated, and the joggle dial 22 is manipulated, these URL addresses are sequentially read to be displayed on the display window 26.

3. URL Address Code Input Sequence by Remote Commander

Next, a description will now be made of a sequential operation for inputting, for instance, an URL address code of "http://www.sony.co.jp" by employing the remote commander RC.

FIG. 5A to FIG. 5L represent characters displayed on the display window 26 when the URL addresses are inputted with employment of the various operation keys.

First, when the INET key 21 is manipulated to advance the present operation mode to the INET mode, as shown in FIG. 5A, a cursor "C" is displayed on the display window 26 in the flicker mode. When the protocol key 29 is depressed under this condition, as indicated in FIG. 5B, for instance, the protocol name of "http" is displayed in the flicker mode. In this case, the protocol key 29 is repeatedly manipulated until a desirable protocol name is displayed. In this embodiment mode, since the protocol name of "http" is selected, this protocol name is determined under this state by manipulating the selection key 30. Furthermore, the present INET mode is switched into the character input mode by manipulating the character input key 27, and then either the "10" key or the "/" key 34 of the numeral/character input key group 24 is operated to enter ":" and "/" "/" (see FIG. 5C). It should be noted that although not shown in this drawing, the display position of the cursor "C" is also moved to the right side every time ":", "/", and "/" are entered.

Alternatively, in such a case that ":" and "/", "/" are entered respectively, the present input operation may be advanced to the subsequent input operation even when this selection key 30 is manipulated. Furthermore, for instance, while the protocol name "http" and also ":", "/", "/" are previously stored as a single protocol name into the memory area 45b, the protocol key 29 is manipulated, so that, for example, such a protocol name of "http://" may be displayed.

When the input operation of "://" is accomplished, the cursor "C" is displayed on the right side, and then the present operation is moved to the host name input operation. In this case, for example, a host name "www" is displayed in the flicker mode instead of the cursor C (see FIG. 5D) by manipulating the host key 31. In this embodiment, since the host name "www" is selected, the selection key 30 is manipulated under this condition (see FIG. 5E).

Moreover, in order to segment the host name as "www", "." is entered by operating the "." key 33, and the present input operation is advanced to the input operation of the organization name. Alternatively, for instance, the host name of "www" and "." may be previously stored into the memory area 45b in such a manner that this host name and the symbol may be displayed at the same time.

The organization name is entered by operating various input keys arranged in the numeral/character key group 24. For instance, when four characters of "sony" is entered, "s" is firstly entered by manipulating the "7" key and then this entered character "s" is determined by manipulating the selection key 30 (see FIG. 5F). Furthermore, other characters of "o", "n", "y" are entered by similarly manipulating the "5" key, the "9" key, and the selection key 30 (see FIG. 5G, FIG. 5H, FIG. 5I). Then, when the input operation of the character "sony" is completed, as illustrated in FIG. 5J, "." is inputted by operating the "." key so as to segment the organization name. Therefore, the present input operation is advanced to the input operation of the identifier name.

In this case, when the identifier key 32 is manipulated, as illustrated in FIG. 5K, for example, an identifier "co.jp" is displayed in the flicker manner. In this embodiment, since the identifier "co.jp" is selected, the input operation of the URL address of "http://www.sony.co.jp" is accomplished by manipulating the selection key 30 (see FIG. 5L). Then, when this entry is correct, the transmit key 36 is operated to thereby transmit the entered URL address as a command to the Internet TV 1.

It should also be understood that although this embodiment mode has described that the organization sort (for example, co (corporate), go (government)), and the country code (for example, jp (Japan)) are employed as a single identifier, each of exclusively-used keys may be separately employed so as to enter these organization sort and country code.

Also, when the memory key 37 is manipulated under such a condition of FIG. 5L, the URL address "http://www.sony.co.jp" is stored into the memory area 45b, and may be read by using the preset key 38, if required. As a consequence, in such a case that the user frequently accesses to this URL address "http://www.sony.co.jp", the user is no longer required to input this URL address.

Referring now to a flow chart indicated in FIG. 6, a description will be made of an URL address input sequential operation.

First, when the INET key 21 is entered, the present operation mode is switched to the INET mode (step S001), and the cursor C is displayed on the display window 26 in the flicker mode, and the present input operation is advanced to the protocol name input operation (step S002 to S003). Then, when the protocol name under the flicker display manner by manipulating the protocol key 29 is correct (step S004), this URL address input operation is advanced to a further step S005 at which this protocol name is determined by manipulating the selection key 30. In this case, it is assumed that symbol "://" is also displayed in combination with the protocol name at the same time. If the protocol name under the flicker display manner is not equal to a desirable protocol name, then the URL address input operation is returned to the previous step S003 at which the protocol key 29 is repeatedly depressed until such a desirable protocol name is displayed.

When the protocol name is determined at the steps S003 to S005, the host key 31 is subsequently manipulated, so that the present input operation is advanced to the input operation of the host name (step S006). When the host name under the flicker display manner by manipulating the host key 31 is correct (step S007), the URL address input operation is advanced to a further step S008 at which the host name is determined by the selection key 30. In this case, it is assumed that symbol "." is also displayed in combination with the host name at the same time. If the host name under the flicker display manner is not equal to a desirable host name, then the URL address input operation is returned to the previous step S006 at which the host key 31 is repeatedly depressed until such a desirable host name is displayed.

When the host name is determined at the step S006 to the step S008, the cursor C is displayed in the flicker manner at the right side of the host name, and then the present input operation is advanced to the input operation of the organization name (for example, "sony") by employing the numeral/character input group 24 and the selection key 30 (step S009). Then, when the input operation of the organization name is accomplished (step S010), the identifier key 32 is manipulated, so that the present input operation is advanced to the input operation of the identifier name (step S011). In such a case that the identifier name under the flicker display manner by manipulating the identifier key 32 is correct (step S012), the URL address input operation is advanced to a further step S013 at which the identifier name is determined by manipulating the selection key 30.

Then, when the URL address entered at the step S003 to the step S013 is correct (step S014), the URL address input operation is advanced to a step S015 at which the transmit key 36 is operated, so that the URL address displayed on the display window 26 is transferred to the Internet TV 1. Upon receipt of this URL address, the Internet TV 1 executes the access process with respect to the received URL address.

Conversely, when the inputted URL address is not correct, as indicated by a broken line, the URL address input operation is returned to the steps at which the protocol name, the host name, the organization name, and the identifier name are entered, and the input operations may be retried for each of these names.

It should be noted that when the transmit key 36 is manipulated at the step S015 and thereafter the URL address is wanted to be stored, the memory key 37 may be manipulated.

As previously described in detail, according to the present invention, for instance, when the URL address used to access the Internet is entered, such a character group indicative of, e.g., the protocol name, the host name, and the identifier name can be entered in the batch mode, because the protocol key 29, the host key 31, and the identifier key 32 are employed. As a consequence, the input operations can be made simpler, and further the erroneous input operations can be reduced.

Also, since the entered URL address can be stored into the memory area 45a of the remote commander RC, for instance, when the next access operation is desirably performed with using the same URL address, the stored URL address is merely read from the memory area 45a to be transmitted by manipulating the preset key 38 and the joggle dial 23. As a result, the input operations of the URL address which is used to frequently access the network can be simplified.

In addition, since the URL address is stored in the remote commander RC, even when this remote commander RC is brought to other places where the different television receivers are set, this URL address may be entered by performing the similar input operation.

It should be understood that although the Internet television receiver has been described in the above-explained embodiment, the present invention may be applied to a personal computer and a set top box.

The protocol name key and the host key have been provided on the remote commander in the above-described embodiment. Alternatively, these exclusively-used keys may be provided on a keyboard of a terminal.

As previously explained, in accordance with the present invention, the exclusively-used input keys are provided with the remote commander, by which when the address and the like are inputted so as to access the Internet and the like, the preselected character group indicative of, for example, the protocol name, the host name, and the identifier name can be entered in the batch mode. As a consequence, the input operations can be further simplified, and also the erroneous input operations can be reduced.

Also, since the key operation similar to the normal operation (channel selection and so on) can be carried out with employment of the remote commander, there is no need to separately employ a character input keyboard, or the like.

Moreover, since the inputted address can be stored in the remote commander, when the user accesses to the same address, this address is arbitrarily read out from this remote commander so as to be transmitted. As a result, a series of the above-described input operations can be omitted. In this case, there is such a merit that even when this remote commander is brought to other places where other terminals such as other television receivers are set, the URL address can be entered in a similar operation.

What is claimed is:

1. A remote commander comprising:
   character inputting means capable of inputting at least one of numbers and characters;
   a plurality of character group storing means for previously storing a plurality of character groups, each of said character groups comprising a portion of a valid URL address name which is being used to access a host on a network;
   character group reading means for selectively and sequentially reading said plurality of character groups stored in said plurality of character group storing means;
   address code generating means for generating a network address code in accordance with said plurality of character groups that form a valid URL address name and at least an additional character and/or additional numbers inputted by said character inputting means; and
   transmitting means for transmitting said network address code to access said host on said network.

2. A remote commander as claimed in claim 1, further comprising:
   display means for displaying the character group read by said character group reading means.

3. A remote commander as claimed in claim 1, further comprising:
   address code storing means for saving an address code corresponding to the valid URL address name transmitted by said transmitting means; and
   address selecting means for sequentially reading the address code stored in said address code storing means.

4. A remote commander as claimed in claim 3 wherein:
   said address selecting means is constituted by a rotary dial.

5. A remote commander as claimed in claim 1 wherein:
   said character group stored in said character group storing means is a protocol name.

6. A remote commander as claimed in claim 1 wherein:
   said character group stored in said character group storing means is a country code.

7. A remote commander as claimed in claim 1 wherein:
   said character group stored in said character group storing means is an organization code.

8. A remote commander comprising:
   character inputting means capable of inputting at least one of numbers and characters;
   a plurality of character group storing means for previously storing a plurality of character groups, each of said character groups comprising a portion of a valid URL address name which is being used to access a host on a network;
   character group reading means for selectively and sequentially reading said character groups stored in said plurality of character group storing means; and
   transmitting means for transmitting a network address code corresponding to said valid URL address name comprising said plurality of character groups read by said plurality of character group reading means,
   wherein at least one of said character groups were previously stored in said character group storing means is a protocol name.

9. A remote commander as claimed in claim 8, further comprising:
   display means for displaying the character group read by said character group reading means.

10. A remote commander as claimed in claim 8, further comprising:
    address code storing means for saving an address code corresponding to the valid URL address name transmitted by said transmitting means; and
    address selecting means for sequentially reading the address code stored in said address code storing means.

11. A remote commander as claimed in claim 10 wherein:
    said address selecting means is constituted by a rotary dial.

12. A remote commander as claimed in claim 8 wherein:
said character group stored in said character group storing means is a country code.

13. A remote commander as claimed in claim 8 wherein:
said character group stored in said character group storing means is an organization code.

14. A remote commander comprising:
a plurality of alpha-numeric input keys;
at least one selection key;
a memory device; and
a control unit connected to said plurality of alpha-numeric keys, said at least one selection key, and said memory device,
wherein said control unit retrieves a portion of an URL network address stored in said memory device in response to operation of said at least one selection key, wherein said portion of said URL network address comprising groups of alpha-numeric characters that form a valid URL network address.

15. A remote commander according to claim 14, further comprising:
a display device connected to receive and display at least the portion of said URL network address retrieved by said control unit.

16. A remote commander according to claim 14, further comprising:
a preset key connected to said control unit, wherein said control unit retrieves a complete URL network address stored in said memory device in response to operation of said preset key.

17. A remote commander according to claim 14, further comprising:
a memory transmission key connected to said control unit, wherein said control unit transmits at least a portion of said URL network address to said memory device in response to operation of said memory transmission key.

18. A remote commander according to claim 14, further comprising:
a transmitter connected to receive and transmit the portion of said URL network address retrieved by said control unit.

19. A remote commander according to claim 18, further comprising:
a transmission control key connected to said control unit, wherein said control unit sends the portion of said URL network address to said transmitter in response to operation of said transmission control key.

20. A remote commander according to claim 14, wherein the portion of said URL network address stored in said memory device is a protocol name, a country code, or an organization code.

21. A remote commander comprising:
a plurality of alpha-numeric input keys;
a first selection key;
a second selection key;
a third selection key;
a memory device; and
a control unit connected to said plurality of alpha-numeric keys, said first, second and third selection keys, and said memory device,
wherein said control unit retrieves a portion of an URL network address stored in said memory device in response to operation of said first, second, or third selection key, wherein said portion of said URL network address comprising groups of alpha-numeric characters that form a valid URL network address.

22. A remote commander according to claim 21, further comprising:
a display device connected to receive and display at least the portion of said URL computer network address retrieved by said control unit.

23. A remote commander according to claim 21, further comprising:
a preset key connected to said control unit, wherein said control unit retrieves a complete URL network address stored in said memory device in response to operation of said preset key.

24. A remote commander according to claim 21, further comprising:
a memory transmission key connected to said control unit, wherein said control unit transmits at least a portion of said URL network address to said memory device in response to operation of said memory transmission key.

25. A remote commander according to claim 21, further comprising:
a transmitter connected to receive and transmit the portion of said URL network address retrieved by said control unit.

26. A remote commander according to claim 21, further comprising:
a transmission control key connected to said control unit, wherein said control unit sends the portion of said URL network address to said transmitter in response to operation of said transmission control key.

27. A remote commander according to claim 21, wherein said control unit retrieves a computer network protocol name from said memory device in response to operation of said first selection key.

28. A remote commander according to claim 21, wherein said control unit retrieves a computer network host name from said memory device in response to operation of said second selection key.

29. A remote commander according to claim 21, wherein said control unit retrieves a computer network organization code and country code from said memory device in response to operation of said third selection key.

30. A network connection system comprising:
a) a remote controller including:
(i) a plurality of alpha-numeric input keys;
(ii) at least one selection key;
(iii) a memory device;
(iv) a control unit connected to said plurality of alpha-numeric keys, said at least one selection key, and said memory device, wherein said control unit retrieves a portion of an URL network address stored in said memory device in response to operation of said at least one selection key; and
(v) a transmitter connected to receive and transmit said portion of said URL network address retrieved by said control unit; and
b) a video display unit including:
(i) a receiving device connected to receive said portion of said URL network address transmitted by said transmitter;
(ii) a computer network interface unit;
(iii) a controller connected to said receiving device and said computer network interface unit, wherein said controller sends said received portion of said URL network address to said computer network interface unit, wherein said portion of said URL network address comprising groups of alpha-numeric characters that form a valid URL network address.

\* \* \* \* \*

UNITED STATES PATENT AND TRADEMARK OFFICE
CERTIFICATE OF CORRECTION

| | | |
|---|---|---|
| PATENT NO. | : 6,243,741 B1 | Page 1 of 1 |
| APPLICATION NO. | : 08/984050 | |
| DATED | : June 5, 2001 | |
| INVENTOR(S) | : Yoshimasa Utsumi | |

It is certified that error appears in the above-identified patent and that said Letters Patent is hereby corrected as shown below:

<u>Title Page:</u>
The title should read:

(54) REMOTE COMMANDER FOR ACCESSING A HOST BY FORMING A NETWORK ADDRESS USING MULTIPLE PORTIONS OF A VALID NETWORK ADDRESS PREVIOUSLY STORED IN MEMORIES

<u>In the claims:</u>

Column 14, line 4, claim 22:

Delete the word "computer".

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 6,243,741 B1  Page 1 of 1
APPLICATION NO. : 08/984050
DATED : June 5, 2001
INVENTOR(S) : Yoshimasa Utsumi It is certified that error appears in the above-identified patent and that said Letters Patent is hereby corrected as shown below:

Title Page and Column 1, lines 1 and 2:
The title should read:

--(54)  REMOTE COMMANDER FOR ACCESSING A HOST BY FORMING A NETWORK ADDRESS USING MULTIPLE PORTIONS OF A VALID NETWORK ADDRESS PREVIOUSLY STORED IN MEMORIES--

In the claims:

Column 14, line 4, claim 22:

Delete the word "computer".

This certificate supersedes the Certificate of Correction issued March 18, 2008.

Signed and Sealed this

Fifteenth Day of April, 2008

JON W. DUDAS
*Director of the United States Patent and Trademark Office*